Figure 1:
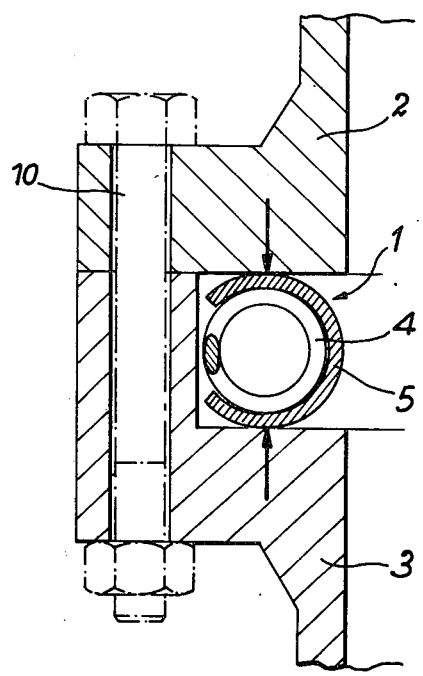

United States Patent [19]
Abbes et al.

[11] 4,114,907
[45] Sep. 19, 1978

[54] RESILIENT METAL GASKET

[75] Inventors: Claude Abbes, Saint Etienne; André Gournier, Saint Priest En Jarez; Christian Rouaud, Bourg Saint Andeol; Raymond de Villepoix, Donzere, all of France

[73] Assignee: Commissariat a l'Energie Atomique, Paris, France

[21] Appl. No.: 830,194

[22] Filed: Sep. 2, 1977

[30] Foreign Application Priority Data

Sep. 9, 1976 [FR] France .................. 76 27178

[51] Int. Cl.² ............................................ F16J 15/02
[52] U.S. Cl. ................. 277/206 R; 277/236; 277/164
[58] Field of Search ................. 277/206, 236, 164

[56] References Cited
U.S. PATENT DOCUMENTS

| 3,058,750 | 10/1962 | Taylor | 277/206 |
|---|---|---|---|
| 3,223,426 | 12/1965 | Reid | 277/206 |
| 3,519,278 | 7/1970 | Fuhrmann et al. | 277/206 |
| 3,519,281 | 7/1970 | Teucher et al. | 277/206 |
| 3,820,799 | 6/1974 | Abbes | 277/164 |

*Primary Examiner*—Robert I. Smith
*Attorney, Agent, or Firm*—Cameron, Kerkam, Sutton, Stowell & Stowell

[57] ABSTRACT

Flexible annular joint having on the one hand a central core constituted by a helical spring made from metal wire with contiguous coils, which is closed on itself and in the inoperative state has the shape of a continuous ring, and on the other hand at least one envelope surrounding the central core and having in the inoperative state a cross-section formed by a curve which is not closed on itself. The internal helical spring comprises at least one continuous wire whose cross-section is a circular segment whose angle at the center is between 180° and 360°, the chord of said segment producing the outer surface of said spring.

3 Claims, 5 Drawing Figures

RESILIENT METAL GASKET

The present invention relates to a flexible annular metal joint which serves to provide a perfect sealing between two bearing surfaces as a result of crushing and elastic deformation properties, which come close to the analogous properties of elastomer materials.

Various constructions of joints of this type are already known and more specifically a joint comprising a core constituted by a helical spring made from metal wire with contiguous coils and a high axial compression tension, which is closed on itself and in the inoperative state is shaped like a torus, said metal spring being surrounded by at least one envelope which in the inoperative position has the shape of a toroidal surface, whose generating circle is not closed on itself. The envelope surrounding the internal spring can be of a varied nature, adapted to the conditions of use of the joint, to the stresses to be withstood in operation and to the nature of the bearing surfaces between which said joint is confined. In particular, said envelope can be made from metal, such as steel, copper, aluminium or any appropriate alloy, or can be made from plastic, for example polytetrafluoroethylene or the like, or finally it can comprise a metal-plastic sandwich, for example with a metal envelope covered by a layer of plastic material, which may or may not be connected to the envelope. The thus obtained joint can have a closed circular contour or a contour formed by rectilinear portions interconnected by curvilinear portions or the like.

In a special embodiment, as illustrated in FIG. 1 of the drawings, the internal spring of the joint in question can be surrounded by two envelopes, whereof one is in contact with the spring and is made from a slightly ductile elastic metal, such as mild steel or stainless steel, whilst the second envelope is made from a ductile metal, for example copper of nickel. In this case the first envelope uniformly distributes the reaction of the partial crushing of the spring during the tightening of the joint on the second envelope which is closely adapted to the shape of the two surfaces between which the joint provides the sealing.

The joints described hereinbefore, which are already known in the art, have the main advantage, with diametric dimensions which may be very large, of making tight the connection between bearing surfaces or the like, whose surface state is not particularly good. Thus, the crushing characteristic of the joint as a function of the stress applied, whereof FIG. 2 of the attached drawings shows graphically for information purposes a group of curves a, b, c, corresponding to different constructional variants of said joint, has a decreasing radiant which, beyond the initial compression phase, leads to a slight variation in the stress for a significant crushing range, which in most cases exceeds one millimeter. This possibility in connection with joints of the indicated type constitutes a fundamental advantage for grooved assemblies receiving the joint, mainly used when the joint is subject during operation to external stresses of variable amplitudes.

Figure 2:
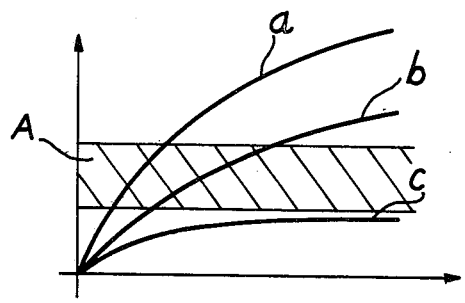

However, on referring again to the graph of FIG. 2 where zone A represents the stress zone necessary for obtaining sealing, it can be seen that only one of the curves shown, carrying the reference letter a, is suitable while curve b which passes through said zone A relative to a wide crushing range is not suitable, because certain joints corresponding to curve b may only bring about the necessary sealing in the case of a crushing value which exceeds that limited by the dimensions of the groove receiving said joints. In all cases curve c, located below zone A must be rejected. Each curve corresponds to a particular joint, whereby an internal spring with in each case a different geometry is used for forming the elastic core. Thus, from among the group of characteristic curves preferably only those are retained which intersect with a considerable radiant the zone of obtaining the necessary sealing, whereby the others are eliminated. However, due to the shape of the curves such a choice has the disadvantage of imposing a significantly higher clamp tightening force for an acceptable crushing. Thus, this supplementary force, which is useless in most cases, represents a certain disadvantage of the flexible joints in question and for which the present invention provides a simple and effective palliative.

To this end the flexible annular joint has on the one hand a central core constituted by a helical spring made from metal wire with contiguous coils, which is closed on itself and in the inoperative state has the shape of a continuous ring, and on the other hand at least one envelope surrounding the central core and having in the inoperative state a cross-section formed by a curve which is not closed on itself, wherein the internal helical spring comprises at least one continuous wire whose cross-section is a circular segment whose angle at the centre is between 180° and 360°, the chord of said segment producing the outer surface of said spring.

Figure 3:
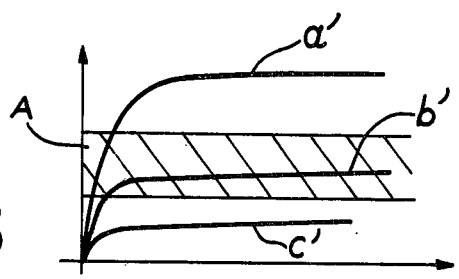

Through the construction of a spring in this way it can be seen that as illustrated by the group of curves in FIG. 3 the stresscrushing characteristic curve of the joint has two separate portions, the first having a relatively steep slope corresponding to the start of the joint compression phase, which in the case of at least certain of these curves makes it possible to very rapidly reach the necessary sealing threshold, then beyond this there is a second and almost level portion where the stress is substantially constant for a wide operating range.

According to another feature the circular segment portion of the wire constituting the internal spring is produced prior to the actual production of the spring by rolling or drawing a wire with a circular section. As a variant the circular segment section of the wire is made after coiling the helical spring by grinding or truing.

Other features of an annular flexible joint according to the present invention can be gathered from the following description of several embodiments, given in an illustrative and nonlimitative manner, with reference to the attached drawings, wherein show:

FIG. 1. Diagrammatically a known flexible annular joint mounted between two clamps.

FIG. 2. A system of coordinates with crushing on the abscissa and stresses on the ordinate, the group of curves corresponding to a flexible annular joint according to FIG. 1.

FIG. 3. In the same crushingstress diagram another group of curves corresponding to the use of an internal spring improved in accordance with the present invention.

Figure 4:
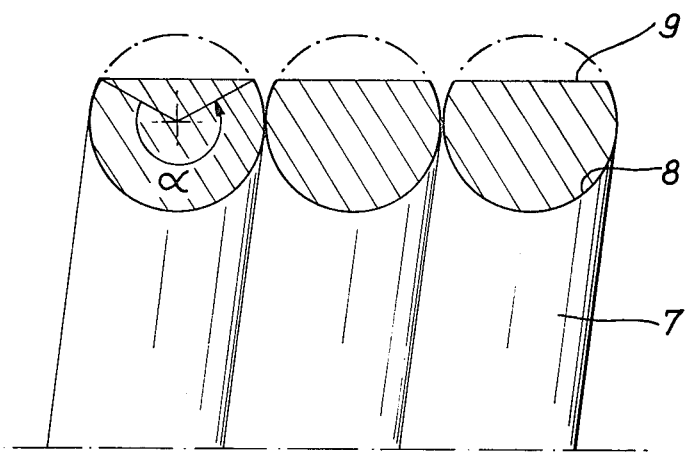
Figure 5:
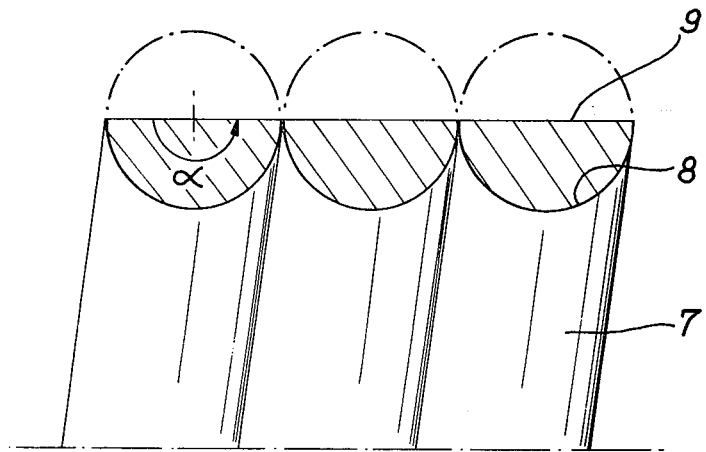

FIGS. 4 and 5. Schematic part sectional view on a larger scale illustrating the shape of the proposed internal spring.

FIG. 1 illustrates in cross-section a known annular joint mounted between two clamps 2 and 3 tightened by studs 10, the joint having a helical internal spring 4 surrounded by an open envelope 5. Envelope 5 can be made from metal or plastic, or any other combination of metal and plastic, permitting by crushing between the opposing faces of clamps 2 and 3 the obtaining of the desired sealing for an appropriate force. In FIG. 2 for example curve a which completely intersects zone A corresponds to the thus obtained joint. As a variant the joint in question can have two successive open envelopes, whereby the inner harder envelope makes it possible to transmit to the outer envelope the reactions of the spring, whereby the suitability of such a joint increases as the diametric dimensions become larger.

According to the invention by giving a special shape to the profile of internal spring 4 it is possible to modify the shape of the representative curve, whereby between $a$ and $a'$ in FIG. 3 there is a steeper initial gradient, followed by a substantially flat portion where the stress remains substantially constant for a crushing action which can vary within a significant operating range. FIG. 3 also shows curves $b'$ and $c'$, corresponding to curves b and c, but whose characteristics are not suitable for the sought solution. Under these conditions, no matter what the crushing value, the necessary stress will only very slightly exceed that necessary for obtaining sealing. Such a characteristic can be obtained by making spring 4 from a metal wire 7 (FIG. 4) having in cross-section a profile defined by a circular arc 8, closed by a chord 9 said arc having an angle at the centre $\alpha$ between 180° and 360°. The special cross-section of the spring can be produced industrially during the production of wire 7 prior to the helical coiling thereof in order to form the spring by rolling a round wire or by drawing. As a variant chord 9 defining the circular arc 8 can be obtained after coiling the spring by removing material by grinding, truing or some other method.

It should be noted that in all cases the configuration of the spring according to the invention does not constitute a simple "flat", that is to say a flat portion made on the initially curved surface of the spring and instead a continuous surface produced by a partly truncated circular contour and defined by a rectilinear chord is made on the outer surface of the spring which serves to come into contact with the envelope.

It is obviously possible to vary at random the reaction of the helical spring with contiguous coils by modifying the value of the angle at the centre $\alpha$ defining the circular segment of the wire cross-section, whereby all values of $\alpha$ between 180° and 360° are possible and whereby a different response curve is obtained for each of them. Nevertheless all are characterised by a sudden variation in the gradient beyond a slight crushing. It is thus possible to modify the reaction of the helical spring and adapted to all types of covering envelope, such as plastic, metal or composite envelopes.

According to another variant shown in FIG. 5 the angle $\alpha$ at the centre of the via cross-section is equal to 180°. In this case the spring has the external configuration of a spiral tube formed from multiple adjacent coils which are independent of one another. Thus, each coil may offer a different reaction from that of two adjacent coils. This property is of particular interest in obtaining the sealing of a clamp assembly having flatness defects or even punctiform defects leading to sudden irregularities in the crushing stress exerted.

Thus, a flexible annular joint is obtained whose performance is significantly superior to that of a conventional joint using an internal spring with a circular cross-section, even if the wire constituting this spring can be calibrated in a very precise manner, for example to 1/100 mm. In all cases the wire with a circular cross-section leads to a greater tightening force for an identical crushing whereby the initial gradient of the curve is always less at the beginning. Thus, there is a greater risk of dispersion for obtaining the sealing action. However, with the joint constructed according to the invention the stress can be reduced, whereby the joint also has a better elastic recovery than with the prior art solutions. Finally it is obvious that the reaction of the internal spring according to the invention can be modified to different levels by varying the angle at the centre of the segment defining the cross-section of the metal wire.

What we claim is:

1. A resilient metal gasket comprising a central core formed by a helical spring of metal wire with contiguous coils closed on itself and in the inoperative state being a continuous ring, at least one envelope surrounding said central core and having in the inoperative state a cross-section formed by a curve including a gap, said internal helical spring comprising at least one continuous wire whose cross-section is a circular segment having an angle at the centre at least equal to 180° and less than 360°, a chord of said segment producing an outer surface of said spring.

2. A gasket according to claim 1, wherein the circlar segment section of the wire constituting the internal spring is obtained prior to making the spring by rolling or drawing a wire with a circular cross-section.

3. A gasket according to claim 1, wherein the circular segment section of the wire constituting the interal spring is obtained after coiling of the spring by grinding or truing.

* * * * *